United States Patent [19]

Neuschäffer et al.

[11] Patent Number: 4,522,652
[45] Date of Patent: Jun. 11, 1985

[54] MACHINE BASE AND PROCESS FOR MANUFACTURE THEREOF

[75] Inventors: Karl-Heinz Neuschäffer, Leichlingen; Hans-Werner Engels, Troisdorf-Sieglar; Hans-Jürgen Gebert, St. Augustin; Robert W. Laube, Siegburg; Günter Zoche, Bonn, all of Fed. Rep. of Germany

[73] Assignee: Dynamit Nobel Aktiengesellschaft, Troisdorf, Fed. Rep. of Germany

[21] Appl. No.: 520,682

[22] Filed: Aug. 5, 1983

[30] Foreign Application Priority Data

Aug. 6, 1982 [DE] Fed. Rep. of Germany ....... 3229339
Feb. 2, 1983 [DE] Fed. Rep. of Germany ....... 3303409

[51] Int. Cl.³ ................................................ C09D 1/02
[52] U.S. Cl. ..................................................... 106/84
[58] Field of Search ........................................... 106/84

[56] References Cited

U.S. PATENT DOCUMENTS 2,423,231 7/1947 Esnault-Pelterie .................. 106/84

Primary Examiner—William R. Dixon, Jr.
Assistant Examiner—Steven Capella
Attorney, Agent, or Firm—Antonelli, Terry & Wands

[57] ABSTRACT

A support or base for low-vibration mounting of machines or the like is made by hardening a molding material in a mold. The base contains a hardened inorganic material with a density of 2.2 to 3.0, particularly 2.5 to 2.7 g/cm³, is made from (a) 15 to 30 weight % of an aqueous 30 to 65% potassium hydroxide-potassium silicate solution in which the $SiO_2:K_2O$ molar ratio is 1.0 to 2.0:1;
(b) 15 to 35 weight % of an oxide mixture containing amorphous $SiO_2$ and aluminum oxide and/or hydrated amorphous silicic acid in the dispersed powder form and/or metakaolin;
(c) 45 to 65 weight % of inorganic particulate fillers.

The potassium silicate solution can be made by dissolving hydrated amorphous silicic acid in potassium hydroxide or its aqueous solution, and in this case, component (b) can consist entirely or partially of metakaolin.

13 Claims, 1 Drawing Figure

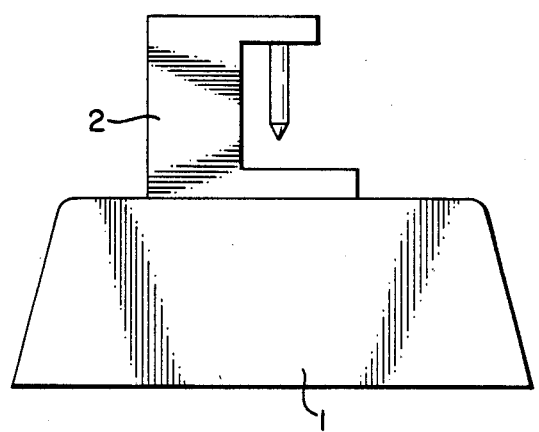

MACHINE BASE AND PROCESS FOR MANUFACTURE THEREOF

The invention consists of a molded support or base for providing low-vibration mounting of machines or the like, made by hardening a molding material composition in a mold and a process for manufacturing such supports. The problem frequently arises of mounting machines which must operate at high precision, such as drilling machines and lathes, in a vibration-free manner so that the fewest possible resonance vibrations arise and are transmitted. Machine supports or bases made of cast steel, granite, and polymer-containing concrete are known. While cast steel bases are not usable in all cases, since they can generate resonance vibrations, polymer-containing concrete is not sufficiently heat resistant in all cases, and granite meets the requirements better but is very expensive since these bases must be quarried from natural rock and worked.

The goal of the invention is to manufacture a machine support which provides low-vibration mountings particularly for precision machines. Such precision machines are, for example, drilling machines with very high speeds for making precision bores or grinding and milling machines for making measuring machines. "Supports" or "bases" are to be construed as also comprising machine mounts, slabs and the like structures for supporting a machine.

Polymer-containing concrete and its applications are described, for example, in the journal *Bautechnik*, 102, No. 35 of 5/2/80, pages 21–24. Polymer-containing concrete contains polyester resin, epoxy resin, or polymethylmethacrylate resin as a binding agent, and silica, quartz sand, etc. as a dry additive.

In organic substances with very versatile applications for plastic objects, tools, and industrial molds are already known from European Patent Application No. 0 026 687. These known inorganic substances, however, have a relatively low density: between 1.5 and 1.8 g/cm$^3$.

The goal of the invention is to produce a low-vibration molded support structure based on inexpensive raw materials which has both a high density and good mechanical properties, and is easy to mold.

The invention will be further understood from the accompanying drawings wherein the single FIGURE illustrates schematically a molded structure or base block and a machine mounted thereon.

According to the invention, the problem is solved by a molded support containing a cured material with a density of 2.2 to 3.0, in particular 2.5 to 2.7 g/cm$^3$, made from 15–30 weight % of an aqueous 30–65% potassium hydroxide-potassium silicate solution; wherein the molar ratio of SiO$_2$ to K$_2$O is 1.0 to 2.0:1, 15–30 weight % of metakaolin and/or oxide mixture as dust with various percentages of amorphous SiO$_2$ and aluminum oxide, and possibly hydrated amorphous silicic acid in the form of a dispersed powder, and 45–65 weight % of at least one inorganic filler. Metakaolin is amorphous and is made from kaolin (a natural product) by careful dehydration at elevated temperatures. The metakaolin or oxide mixture, which are used in dust form only, serve as reactant with the hardener; i.e., the aqueous potassium hydroxide-potassium silicate solution. Suitable preferred fillers are heavy fillers such as corundum, heavy spar, zirconium sand, mica, bauxite tailings, ground basalt, quartz, feldspar, quarried granite, lead compounds, etc., the fillers being in form of powder and/or fine up to coarse grains. It will be understood that the term "dust" as used herein to designate the form of the oxide mixtures or metakaolin refers to fine particulate material with a particle size less than 0.015 mm; whereas the term "powder" as used herein to describe the fillers and other powdery materials refers to particulate material having a particle size greater than 0.050 mm up to 0.3 mm or more.

One advantageous embodiment of the invention is a molded support comprising a hardened inorganic molding material with a density of 2.2 to 3.0 is made from a molding material containing 15–30 weight % of an aqueous 30–65% potassium hydroxide-potassium silicate solution with an SiO$_2$:K$_2$O molar ratio of 1.0–1.0:1, wherein the potassium silicate solution is made by dissolving hydrated amorphous silicic acid in a dispersed powder form in potassium hydroxide or an aqueous solution thereof; 15–35 weight % of metakaolin and/or an oxide mixture as dust containing amorphous SiO$_2$ and aluminum oxide and/or hydrated amorphous silicic acid in the dispersed powder form and 45–65 weight % of at least one filler.

The machine supports produced from an inorganic composition according to the invention can be made in any desired dimensions by molding. Because of their high density and structure, the supports have a low tendency to vibrate by resonance and make possible, for example, low-vibration mounting of fast-running precision machines. The surfaces can be worked after molding for mounting the machines. The supports or bases have a high compressive strength of at least 60 N/mm$^2$ and sufficient hardness according to Mohs scale of about 6 to 9. The potassium silicate solution containing aqueous potassium hydroxide forms the hardener which reacts with components of the oxide mixture or hydrated silicic acid or with metakaolin. The potassium silicate solution can be a commercial potassium silicate solution, a so-called water-glass solution, or can be made according to the invention by dissolving aqueous amorphous silicic acid in the form of a dispersed powder in a solution of potassium hydroxide or by mixing solid potassium hydroxide into aqueous amorphous silicic acid which liquefies.

The oxide mixture containing amorphous SiO$_2$ and aluminum oxide has widely varying contents of both oxides whose combined proportions often amount of 70 to over 95 weight % of the oxide mixture, but percentages lower than 70 weight % and higher percentages of other oxides are possible. The oxide mixture is anhydrous. It consists exclusively or predominantly of mixtures of oxides. Such oxide mixtures are typically made by industrial high-temperature melting processes as dusts and initially form a vapor or gaseous phase from which they are precipitated on cooling as finely divided dust. The oxide mixtures frequently do not correspond to the composition of the industrial melt product.

X-ray analysis shows no indication of crystalline SiO$_2$; whereas crystalline Al$_2$O$_3$ is present at least in part as $\alpha$-Al$_2$O$_3$ (corundum) and in varying amounts as $\beta$-Al$_2$O$_3$ containing alkali. Iron oxides can be present, for example, as Fe$_2$O$_3$. Alkaline earths, particularly CaO, are sometimes present in small quantities. Small amounts of alkali fluorides, P$_2$O$_5$ or ZrO$_2$ can occur depending on the composition of the melt product.

The oxide mixture can contain 7–75 weight % of SiO$_2$ and 12–87 weight % of Al$_2$O$_3$; whereby high SiO$_2$ levels or high Al$_2$O$_3$ levels can occur depending on the melting process, and even occur in the same melting process at the beginning or end of the process. Suitable oxide mixtures occur in the melting process when various types of corundum, or mullite, are produced and also in the manufacture of elementary silicon, ferrosilicon, and in metal smelting. The suitable oxide mixtures used with the invention are in dust form, as the large surface area of the dust serves for the necessary reaction with the hardener. The metakaolin receives the necessary dust form by milling.

Insolubility in alkali silicate solutions in the making of molding material and reactivity with aqueous alkali silicate solution or with aqueous alkali hydroxide solution in the aqueous molding material for the stone building component of the molded body are characteristic for the applicability of the oxide mixtures.

The amorphous hydrated silicic acid in the dispersed powder form comes as a storable pourable powder, is filter-moist, or is a semi-liquid gel. The water content can be 20–60 weight % or even more; whereby the dry substance is determined analytically to be 85–100 weight % $SiO_2$, with smaller proportions of aluminum oxide, iron oxide, and metal fluorides, among others, and sometimes ammonium fluoride as well as that loss on heating. Such amorphous aqueous silicic acids in the dispersed powder form are generally obtained by precipitation from aqueous solutions, for example, by preparation and purification of mineral basic materials in the aluminum industry, for example, by reaction of $H_2SiF_6$ into alkali fluorides or kryolith or from aqueous silicate solutions produced in another way. In the case of these hydrated amorphous silicic acids which are separated in numerous industrial processes, it is merely necessary that they are present in the amorphous, finely divided form, and reactive during stone building. The addition of materials based upon bauxite and bauxite processing (tailings) has proven particularly advantageous, since it gives relatively high strength to the base. The aluminum oxide used as filler is crystalline in powder or grain form, whereby the powder or grain form is received by milling and/or crushing of crystallite particulate aluminum oxide and this aluminum oxide does not react with the hardener; i.e., the aqueous potassium hydroxide-potassium silicate solution.

The fillers usable for the invention are not limited to those named above, but other suitable materials, particularly those which increase the density in the desirable range or increase strength, can also be used. The fillers do not react with the accelerator or hardener.

A preferred composition for a molding material for making the supports or bases, according to the invention, contains 22–27 weight % of an aqueous potassium silicate solution containing 30–65% potassium hydroxide, with a ratio of 1.3 to 1.5 mol $SiO_2$:1 mol $K_2O$; 18–23 weight % of metakaolin, 10–15 weight % of aluminum oxide as filler in the powdered or fine-grained crystalline form, 10–15 weight % of heavy spar, 10–15 weight % of zirconium sand in the natural form, 10–15 weight % of bauxite tailings, and 0–10 weight % of mica, ground slate, ground quartz, or the like. The fillers can be used in the ground fine-powdered to fine-grained and coarse-grained form, a mixture is preferred. It is also possible, as a further embodiment of the invention, to reinforce the base with metal, wire inserts, mesh, or the like which are set into the mold. These are also necessary to facilitate transportation of large bases; namely, to stabilize them.

The addition of bauxite tailings has proven particularly advantageous, since they make the base relatively strong.

The process for making a molded machine support or base, according to the invention, is as follows: first, a mixture is made of the solids, whereby the mixture is cooled to a temperature of less than 30° C., for example, by cooling the mixing equipment or by pre-cooling the liquid components, preferably less than 25° C., whereby the potassium silicate solution containing potassium hydroxide is admixed, following which the mixture is deaerated either before it is placed in the mold or in the mold itself and then hardened at a temperature below 100° C., preferably in the range 60°–95° C., in the mold. It is important to keep the temperature during mixing below 30° C. to prevent early reaction of the components. The hardening temperature should be sufficiently below the boiling temperature of water to prevent vapor formation. The hardening time depends on the dimensions of the base and ranges from half an hour with very small dimensions to several days. In some cases, it is advantageous to have a post-hardening time after the hardening time, which produces an increase in strength. This post-hardening time can entail curing at about 50° C. for 3–5 days after removal from the mold, or simply storing the material in air for a longer time.

The preferred composition of the molding material is one consisting essentially of:

(a) 16–25 weight % of an aqueous 30–65 weight % potassium hydroxide-potassium silicate solution;

(b) 20–33 weight % oxide mixture and/or hydrated amorphous silicic acid or metakaolin in whole or in part; and (c) 45–65 weight % fillers (i.e., at least one inorganic particulate filler material).

A mixture of several of the above-named fillers is preferred as a filler. Provided the potassium silicate solution is made by dissolving aqueous amorphous silicic acid, component (b) can consist entirely or partially of metakaolin.

The weight ratio of the component (a) to component (b) is preferably 0.5:1–1.5:1.

EXAMPLE 1

In this example 20 kg of an oxide mixture containing 42 weight % of largely amorphous reactive silicon dioxide, 50 weight % of aluminum oxide, 2 weight % of iron oxide, and smaller proportions of other oxides are mixed intensively with 11 kg powdered corundum and powdered heavy spar, 13 kg zirconium sand and bauxite tailings, 6 kg mica, and 1.5 kg coloring pigments, then 24.5 kg of a potassium hydroxide-potassium silicate solution, which has been made by dissolving potassium hydroxide in a potassium water-glass solution, wherein the molar ratio between $SiO_2$ and $K_2O$ is 1.5:1 and the water content of 50 weight % is added to the solids mixture, and the resulting admixture poured into a mold wherein the molding material is cooled, deaerated, and hardened at 90° C. A base support with dimensions $100 \times 100 \times 20$ cm is molded, having a density of 2.81 g/cm$^3$, a compressive strength of 95 N/mm$^2$ and a Mohs surface hardness of 8.

EXAMPLE 2

Initially, 13.3 kg of an oxide mixture containing 36 weight % of largely amorphous reactive silicon dioxide, 56 weight % of aluminum oxide, 5 weight % of iron oxide, and smaller amounts of other oxides are mixed intensively with 4.5 kg of powdered corundum, powdered heavy spar, zirconium sand, and bauxite tailings, then 8.5 kg of a potassium hydroxide-potassium silicate solution with an $SiO_2:K_2O$ molar ratio of 1.4, produced by dissolving a hydrated amorphous silicic acid with a solids content of 50 weight % in an aqueous potassium hydroxide solution, is admixed with the solids to form a homogeneous molding material. Thereafter, while cooling, the material is poured into a mold, deaerated, and hardened at 85° C. A base support with dimensions of 100×100×20 cm is molded, having a density of 2.85 g/cm$^3$ and Mohs surface hardness of 8 to 9.

EXAMPLE 3

A solid mixture is made of the following components:
Metakaolin: 20 parts by weight
Aluminum oxide: 12 parts by weight
Ground heavy spar: 13 parts by weight
Natural zirconium sand: 12 parts by weight
Mica: 6 parts by weight
Bauxite tailings: 13 parts by weight.

Thereafter, the hardener; namely, 25 parts by weight of an aqueous 50% potassium hydroxide-potassium silicate solution, wherein the $SiO_2:K_2O$ molar ratio is 1.35:1, is added. While being cooled, so that in no case is a temperature of 30° C. exceeded, the mixture is finally mixed, deaerated, then poured into a mold and compacted by vibration. A base block with the dimensions 100×100×20 cm is made with the mold, having a density of 2.55 g/cm$^3$, a compressive strength of 90 N/mm$^2$, and a Mohs surface hardness of 7.

The deaeration is effected in the example by vibration of the mold or by vacuum to avoid trapped air.

The accompanying figure shows, schematically, a base block for mounting machines, wherein reference numeral 1 represents the base and reference numeral 2, the machine.

What is claimed is:

1. A molded support structure for low-vibration mounting of machines or the like devices which exhibits a compressive strength of at least 60 N/mm$^2$ and a hardness according to the Mohs scale of 6 to 9 and which comprises a molded structure made by hardening a molding material in a mold to provide a hardened inorganic molding material with a density of 2.2 to 3.0 g/cm$^3$, said molding material containing 15 to 30 weight % of an aqueous 30–65% potassium hydroxide-potassium silicate solution with an $SiO_2:K_2O$ molar ratio of 1.0–2.0:1, 15–35 weight % of an oxide mixture containing amorphous $SiO_2$ and aluminum oxide and/or of hydrated amorphous silicic acid in the dispersed powder form and/or metakaolin; and 45 to 65 weight % inorganic particulate filler.

2. A molded support structure according to claim 1, wherein said hardened inorganic molding material with a density of 2.2 to 3.0, made from a molding material containing 15–30 weight % of an aqueous 30–65% potassium hydroxide-potassium silicate solution with an $SiO_2:K_2O$ molar ratio of 1.0–2.0:1, wherein the potassium hydroxide-potassium silicate solution is made by dissolving hydrated amorphous silicic acid in a dispersed powder form in potassium hydroxide or an aqueous solution thereof; 15–35 weight % of metakaolin and/or an oxide mixture containing amorphous $SiO_2$ and aluminum oxide and/or hydrated amorphous silicic acid in the dispersed powder form and 45–65 weight % of at least one filler.

3. A molded support structure according to claim 1, wherein said hardened inorganic molding material with a density of 2.2 to 3.0 g/cm$^3$ is made from 20–30 weight % of an aqueous 30–65% potassium hydroxide-potassium silicate solution with an $SiO_2:K_2O$ molar ratio of 1.3–1.55:1, 15–25 weight % of metakaolin, and 45–65 weight % of inorganic fillers.

4. A molded support structure according to claim 1, wherein said filler comprises aluminum oxide, heavy spar, zirconium sand, mica, bauxite smelting tailings, ground basalt, quartz, feldspar, quarried granite, lead compounds, or mixtures thereof.

5. A molded support structure according to claim 3, wherein said molding material contains 22–27 weight % of an aqueous 30–65% potassium hydroxide-potassium silicate solution, in which the $SiO_2:K_2O$ molar ratio is 1.3–1.55:1; 18–23 weight % metakaolin; 10–25 weight % aluminum oxide in the form of corundum; 10–15 weight % heavy spar; 10–15 weight % zirconium sand; 10–15 weight % bauxite tailings; and 0–10 weight % mica, ground slate or ground quartz.

6. A molded support structure according to claim 1, wherein reinforcements made of metal, wire inserts or steel mesh are embedded within the hardened molding materials.

7. A process for making a molded support structure which comprises preparing a solids mixture from an oxide mixture containing amorphous $SiO_2$ and aluminum oxide and/or a hydrated amorphous silicic acid in dispersed powder form and/or metakaolin and inorganic particulate filler, then admixing an aqueous 30–65% potassium hydroxide-potassium silicate solution with the solids mixture during cooling to temperatures below 30° C., then placing the resulting admixture in a mold, and hardening the admixture at a temperature below 100° C.; said admixture containing 15–30 weight % of the aqueous 30–65% potassium hydroxide-potassium silicate solution with an $SiO_2:K_2O$ molar ratio of 1.0–2.0:1, 15–35 weight % of the oxide mixture containing amorphous $SiO_2$ and aluminum oxide and/or of the hydrated amorphous silicic acid in the dispersed powder form and/or metakaolin, and 45–65 weight % of the inorganic particulate filler.

8. A process according to claim 7, wherein the admixture is deaerated before it is placed in the mold, or while in the mold.

9. A molded support structure according to claim 1, wherein said oxide mixture contains 70 to 95 weight % of amorphous $SiO_2$ and $Al_2O_3$ and 30 to 5 weight % of different metal oxides and alkaline oxides.

10. A molded support structure according to claim 1, wherein said oxide mixture comprises 7 to 75 weight % of amorphous $SiO_2$ and 12 to 87 weight % of $Al_2O_3$.

11. A molded support structure according to claim 9, wherein said oxide mixture comprises 7 to 75 weight % of amorphous $SiO_2$ and 12 to 87 weight % of $Al_2O_3$.

12. A molded support structure for low-vibration mounting of machines or like devices which exhibits a compressive strength of at least 60 N/mm$^2$ and a hardness according to the Mohs scale of 6 to 9 and which comprises a molded structure made by hardening a molding material in a mold to provide a hardened inorganic molding material with a density of 2.2 to 3.0 g/cm$^3$, said molding material containing 15 to 39 weight % of an aqueous 30–65% potassium hydroxide-potassium silicate solution with an $SiO_2:K_2O$ molar ratio of 1.0–2.0:1, 15–35 weight % of an oxide mixture containing amorphous $SiO_2$ and aluminum oxide and/or metakaolin.

13. A process according to claim 7, wherein the aqueous potassium hydroxide-potassium silicate solution is admixed with the solids mixture during cooling to temperatures below 25° C. and the resulting admixture is hardened at a temperature in the range of 60°–95° C.

* * * * *